July 8, 1958 D. RICHMAN 2,842,613

CONTROL APPARATUS FOR TELEVISION RECEIVERS

Original Filed July 21, 1950 2 Sheets-Sheet 1

INVENTOR.
DONALD RICHMAN

BY Everett A. Gartrell
ATTORNEY

July 8, 1958 D. RICHMAN 2,842,613

CONTROL APPARATUS FOR TELEVISION RECEIVERS

Original Filed July 21, 1950 2 Sheets-Sheet 2

INVENTOR.
DONALD RICHMAN

BY Everett A. Gartrell

ATTORNEY

United States Patent Office 2,842,613

Patented July 8, 1958

2,842,613

CONTROL APPARATUS FOR TELEVISION RECEIVERS

Donald Richman, Fresh Meadows, N. Y., assignor to Hazeltine Research, Inc., Chicago, Ill., a corporation of Illinois

Continuation of application Serial No. 175,191, July 21, 1950. This application November 17, 1955, Serial No. 547,579

19 Claims. (Cl. 178—7.3)

*General*

The present invention relates to control apparatus for use in television receivers and is especially directed to synchronizing-signal separating apparatus having improved immunity to undesired noise present in an applied composite video-frequency signal. The present application is a continuation of application Serial No. 175,191, filed July 21, 1950, and entitled "Control Apparatus for Television Receivers." Although the invention is particularly suited for use as a synchronizing-signal separating apparatus, it may also be used to perform the additional function of automatically controlling an operating characteristic of a television receiver, for example, the gain or amplification thereof.

In accordance with present television practice, there is developed and transmitted a signal which comprises a carrier wave modulated during recurrent intervals or trace periods by picture components representative of the light and shade values of an image being transmitted. During retrace intervals between the trace periods, the carrier wave is modulated by synchronizing-signal components or pulses which correspond to the initiation of successive lines and fields in the scanning of the image being televised. At the receiver, a beam is so deflected as to scan and illuminate a target in a series of fields of parallel lines. The picture components of the received signal are utilized to control the intensity of the scanning beam. The line-scanning and the field-scanning components are separated from the picture components and from each other and are utilized to synchronize the operation of the receiver line-scanning and field-scanning generators with the similar scanning apparatus utilized at the transmitter in developing the transmitted signal. The transmitted image is thereby reconstructed on the target of the receiver.

Synchronizing systems of television receivers are particularly sensitive to high-amplitude noise interference which impairs the operation of the receiver scanning generators. It is highly important that the synchronization of both the line-scanning and the field-scanning generators of such a receiver be accomplished with precision in order that proper scanning may be obtained. It is particularly significant that synchronization of the line-scanning generator be extremely accurate in view of its high operating frequency and also in view of the very short duration of the synchronizing pulses applied to that generator. It is well known to those skilled in the television art that a burst of static or noise may mask a substantial number of line-synchronizing pulses or, if the static constitutes high-amplitude random noise pulses, may undesirably cause the line-scanning generator to synchronize with the random pulses and thus cause faulty scanning. Since the field-frequency generator operates at a relatively low frequency and is controlled by pulses of long duration, it is less susceptible than the line-scanning generator to noise disturbances of the type under consideration. However, accurate synchronization of the last-mentioned generator is nevertheless important in a television receiver.

In view of the well-known susceptibility of the scanning systems of television receivers to noise disturbances, some such receivers have utilized synchronizing-signal separating apparatus which are substantially blocked against undesired disturbances during a portion of each operating cycle. Although synchronizing-signal separating apparatus of this type has been found to be generally satisfactory, the circuits thereof have often required the use of time-delay networks and other circuit components which render the apparatus relatively complex and, hence, more expensive to manufacture than is desirable for many applications.

It is also desirable that a television receiver include suitable apparatus for developing a control effect automatically to control an operating characteristic thereof, such as the gain or amplification. It is desirable that this gain-control effect, usually referred to as an A. G. C. effect, be determined by the intensity of the incoming signal, that is, the intensity of the carrier-wave signal, and be substantially independent of its picture modulation components. Furthermore, it is especially desirable that the automatic-gain-control apparatus, like the synchronizing-signal separating apparatus, exhibit a high immunity to noise of the sort mentioned above. Automatic-gain-control apparatus of this type is capable of developing an automatic-gain-control effect which in turn is effective very accurately to maintain the signal input to the various stages of the receiver within a relatively narrow range for a wide range of received signal intensities.

An automatic-gain-control apparatus of the type just mentioned, which is keyed into operation only during the occurrence of the line-synchronizing pulses and which is effective to reject undesired interference such as noise, is disclosed and claimed in United States Letters Patent No. 2,547,648 of Arthus V. Loughren granted April 3, 1951 and entitled "Automatic-Contrast-Control System for Television Apparatus." Such apparatus is becoming very widely employed in television receivers. Manifestly, it would be desirable to obtain from a simple synchronizing signal separating apparatus, which apparatus is relatively immune to noise, not only a desired synchronizing signal but also an automatic-gain-control effect similar to that derived by apparatus in accordance with the above-identified Patent No. 2,547,648.

It is an object of the invention, therefore, to provide for use in a television receiver a new and improved synchronizing-signal separating apparatus which avoids one or more of the disadvantages of prior such apparatus.

It is another object of the invention to provide for use in a television receiver a new and improved synchronizing-signal separating apparatus which is simple in construction, inexpensive to manufacture and yet is capable of providing excellent rejection of interference such as random or impulse noise.

It is a further object of the invention to provide for use in a television receiver a new and improved synchronizing-signal separating apparatus which is substantially unaffected by undesired noise appearing between individual line-synchronizing pulses of an applied signal.

It is an additional object of the invention to provide a new and improved control apparatus for a television receiver.

It is a specific object of the invention to provide a simple, reliable control apparatus for a television receiver which is not only capable of deriving improved synchronizing-signal information from an applied composite video-frequency signal but also an automatic-gain-control effect which is substantially unaffected by undesired noise appearing in the applied signal.

It is yet another object of the present invention to provide for a television receiver a control apparatus which is effective to derive substantially noise-free synchronizing signals having amplitude variations that are relatively small compared with amplitude variations of the applied composite video-frequency signal and which is also effective simultaneously to derive an automatic-gain-control effect having a value proportional to the amplitude of the received carrier-wave signal but substantially unaffected by noise.

In a television receiver, a synchronizing-signal separating apparatus in accordance with a particular form of the present invention comprises an electron-discharge means having input electrodes including a control electrode and a cathode and output electrodes effectively including an anode and the cathode. The synchronizing-signal separating apparatus also includes a circuit coupled to the input electrodes for applying thereto a composite modulation signal, the amplitude of which may vary and which includes the original unidirectional components, and undesired random noise pulses and synchronizing-signal pulses having such polarity as to tend to render the electron-discharge means conductive. The apparatus further includes an integrating network connected as a cathode load for the electron-discharge means and including a point thereon remote from the cathode maintained at a fixed reference potential and having a time constant at least several times the period of the synchronizing pulses and dynamically responsive to electron discharges between the output electrodes for deriving a control effect normally maintaining the electron-discharge means in a nonconductive condition. The apparatus additionally includes a circuit including a direct-current path connected between the anode and the fixed reference point, and a source of a control signal having an amplitude substantially unaffected by amplitude variations of the synchronizing pulses coupled to the output electrodes for supplying the aforesaid control signal thereto in synchronous relation with the synchronizing pulses and with such polarity as to develop the aforesaid electron discharges and render the electron-discharge means conductive substantially only during the coincidence of the synchronizing pulses and the control signal, thereby to develop across the network the above-mentioned control effect having a value dynamically related to the peak amplitude of the synchronizing pulses but substantially independent of the undesired noise pulses. The synchronizing-signal separating apparatus also includes a synchronizing-signal stripper means including an electron-discharge device coupled to the aforesaid applying circuit and to the network at a point other than the fixed reference point and responsive to the modulation signal and the aforesaid control effect for deriving from the modulation signal synchronizing pulses which have variations in magnitude that are small compared with the aforesaid amplitude variations of the composite signal.

For a better understanding of the present invention, together with other and further objects thereof, reference is had to the following description taken in connection with the accompanying drawings, and its scope will be pointed out in the appended claims.

Referring to the drawings.

Figure 1:
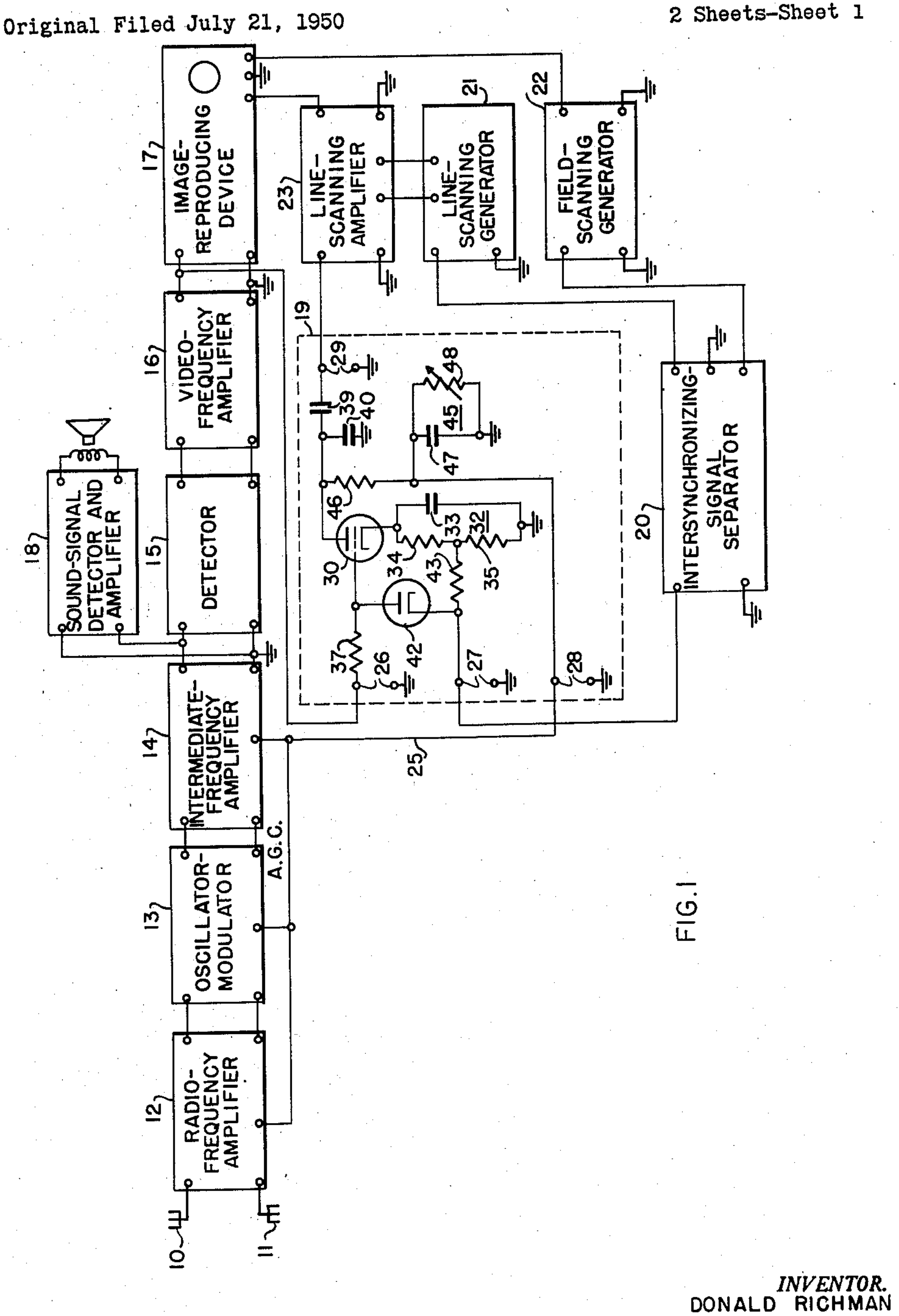
Fig. 1 is a circuit diagram, partly schematic, of a complete television receiver including a control apparatus in accordance with a particular form of the present invention.

*General description of Fig. 1 receiver*

Referring now more particularly to Fig. 1 of the drawings, the television receiver there represented comprises a receiver of the superheterodyne type including an antenna system 10, 11 coupled to a radio-frequency amplifier 12 of one or more stages. There is coupled to the latter unit in cascade, in the order named, an oscillator-modulator 13, an intermediate-frequency amplifier 14 of one or more stages, a detector 15, a direct-current video-frequency amplifier 16 of one or more stages and a cathode-ray image-reproducing device 17 of conventional construction provided with the usual line-frequency and field-frequency scanning coils (not shown) for deflecting the cathode-ray beam in two directions normal to each other. Connected to the output terminals of the intermediate-frequency amplifier 14 is a conventional sound-signal detector and amplifier 18 which comprises the usual frequency detector, amplifiers and sound-reproducing device.

An output circuit of the video-frequency amplifier 16 is coupled to an input circuit including input terminals 26, 26 of a synchronizing-signal separating and control apparatus 19, and an output circuit of the latter including output terminals 27, 27 is coupled to a line-scanning generator 21 and a field-scanning generator 22 through an intersynchronizing-signal separator 20. The output circuit of the generator 21 is coupled in a conventional manner to the line-scanning coil of the image-reproducing device 17 through a line-scanning amplifier 23 while the field-scanning generator 22, which may include suitable amplifiers, is connected to the field-scanning coil of the image-reproducing device. An output circuit of the line-scanning amplifier 23 is connected to input terminals 29, 29 of the control apparatus 19. Output terminals 28, 28 of the control apparatus 19 are connected to the input circuits of one or more of the stages of the units 12, 13, and 14 by a contol circuit conductor 25 to supply an automatic-gain-control or A. G. C. effect to those stages. The units 10–23, inclusive, with the exception of the apparatus 19 which is constructed in accordance with the present invention and will be described in detail hereinafter, may be of conventional construction and operation so that a detailed description and explanation of the operation thereof are unnecessary herein.

*General operation of Fig. 1 receiver*

Considering briefly, however, the general operation of the above-described receiver as a whole, television signals intercepted by the antenna system 10, 11 are selected and amplified in the radio-frequency amplifier 12 and are supplied to the oscillator-modulator 13 wherein they are converted into intermediate-frequency signals. The latter, in turn, are selectively amplified in the intermediate-frequency amplifier 14 and are delivered to the detector 15. The modulation components of the signal are derived by the detector 15 and are applied to the video-frequency amplifier 16 wherein those components including the original unidirectional components are amplified and from which they are supplied to the input circuit of the image-reproducing device 17.

A control voltage, which is derived in a manner to be explained in detail subsequently by an automatic-gain-control supply in the unit 19, is applied by the control circuit conductor 25 as an automatic-amplification-control bias to the gain-control circuits of units 12, 13, and 14 to maintain the signal input to the detector 15 within a relatively narrow range for a wide range of received signal intensities. The unit 19 also selects the synchronizing signals from the other modulation components of the composite video-frequency signal applied thereto by the video-frequency amplifier 16 in a manner which will be explained in detail hereinafter. The line-synchronizing and field-synchronizing signals derived by the unit 19 are applied by the terminals 27, 27 to the intersynchronizing-signal separator 20 wherein they are separated from each other and are then supplied to individual ones of the generators 21 and 22 to synchronize the operation thereof. An electron beam is produced by the cathode-ray image-reproducing device 17 and the intensity of this beam is controlled in accordance with the video-frequency and control voltages impressed on the brilliancy control electrode thereof. Saw-tooth-current waves are generated in the line-frequency and field-frequency generators 21 and 22, respectively. The output signal of the generator 21 is supplied to the line-scanning coil of unit 17 through the amplifier 23 while the output signal of generator 22 is supplied directly to the field-scanning coil of device 17 to produce the usual scanning fields, thereby to deflect the cathode-ray beam of device 17 in two directions normal to each other to trace a rectilinear scanning pattern on the screen of the tube and thereby reconstruct the translated picture.

The audio-frequency modulation components of the received signal are derived in a conventional manner by the sound-signal detector and amplifier 18 and are applied to the loudspeaker thereof and converted to sound.

*Description of control apparatus of Fig. 1*

Referring more particularly to Fig. 1 of the drawings, the synchronizing-signal separating and automatic-gain-control apparatus 19 for the television receiver includes an electron-discharge means such as a triode 30 which is so arranged as to have at least two operating condition which are more fully to be described hereinafter. The apparatus 19 includes an integrating network 32 which has a relatively high impedance and is connected between the cathode of the triode and a fixed reference potential such as ground and, hence, appears in series relation with the space-current path of the tube. This network comprises an energy-storage device in the form of a condenser 33 which is connected in parallel with a pair of series-connected resistors 34 and 35. The network 32 preferably has a time constant which is at least several times the period of the line-synchronizing signal components applied to the input terminals 26, 26 of unit 19.

The apparatus 19 further includes means coupled to the input electrodes of the tube 30 including the control electrode thereof for applying thereto the composite modulation or video-frequency signal derived by the detector 15, the amplitude of which signal may vary and which effectively includes picture components, at least one type of synchronizing-signal components, namely the line-synchronizing signal components, and the original unidirectional components representative of light variations and which may include undesired random noise pulses at least some of which may have an amplitude greater than the amplitude of the synchronizing-signal components. This means comprises the input terminals 26, 26 which are connected to the output circuit of the video-frequency amplifier 16 and also comprises a current-limiting resistor 37 connected between the high-potential one of those terminals and the control electrode of the tube 30.

The apparatus also includes a source of a control signal having an amplitude substantially unaffected by amplitude variations of the synchronizing-signal components derived by the receiver and a circuit for supplying the aforesaid control signal to one of the electrodes of the tube 30, specifically to the anode thereof, in synchronous relation with the application of the line-synchronizing signal components to the control electrode, to convert the tube from one operating condition to another substantially only during the intervals of the line-synchronizing signal components, thereby to develop across the network 32, in a manner to be explained subsequently, a control effect related to the peak amplitude of the line-synchronizing signal components but substantially independent of the accompanying undesired random pulses. This control-signal source comprises an input circuit including the input terminals 29, 29 which are coupled to an output circuit of the line-scanning amplifier 23 and to the tube 30 through a coupling condenser 39. A condenser 40 is connected between the anode of the tube 30 and ground and effectively constitutes the input impedance of that circuit. The high-potential one of the terminals 29, 29 is preferably coupled to a suitable point in the line-scanning amplifier 23 such as the anode of the amplifier tube where there is developed in a conventional manner during each line-retrace interval a relatively high-amplitude, short-duration impulse of positive polarity due to the collapsing magnetic field in the circuits associated with the line-scanning coil of the image-reproducing device 17. The well-known characteristics such as the Q of the tuned circuits of the generator 21 and its amplifier 23 are such that the positive output pulse applied to the terminals 29, 29 has an amplitude which is substantially unaffected by amplitude variations or temporary loss of the synchronizing-signal components applied to the terminals 26, 26 of unit 19 from the video-frequency amplifier 16.

The synchronizing-signal separating and automatic-gain-control apparatus 19 additionally includes a parallel-connected resistor 48 and condenser 47 forming a second integrating network 45 which, like the network 32, has developed thereacross a control effect having a value proportional to the space or cathode current of the tube 30 and related to the peak amplitudes of the line-synchronizing signal components but substantially independent of undesired random pulses. One terminal of the network 45 is coupled to the anode of the tube 30 through a resistor 46 while the other terminal thereof is connected to a point of fixed potential such as ground. The network 45 and the resistor 46 constitute a direct-current path between the anode of tube 30 and ground. The junction of the network 45 and the resistor 46 is connected to the automatic-gain-control output terminals 28, 28 of the unit 19. The network 45 is preferably proportioned to have a time constant at least several times the interval between line-synchronizing pulses. The operating potentials developed for application to the tube 30, in particular that developed across the network 32, are such that it is normally nonconductive.

The unit 19 further includes synchronizing-signal stripper means including an electron-discharge device, specifically a unidirectionally conductive or rectifier device such as a high back impedance diode 42, and a relatively large load impedance or resistor 43 therefor coupled in series relation between the applying means and the network 32 effectively for deriving across the resistor 43 synchronizing-signal components which are substantially independent of the undesired random pulses and which have variations in magnitude that are small compared with the amplitude variations of the video-frequency signal applied to the terminals 26, 26. In particular, the anode of the diode is connected to the control electrode of the tube 30 while the cathode is connected to the high-potential one of the synchronizing-signal output terminals 27, 27 and to one terminal of the resistor 43 having a relatively high impedance. The other terminal of the latter is preferably connected to the junction of the resistors 34 and 35 for applying a suitable operating bias potential to the cathode of the tube 42 which normally maintains it nonconductive.

*Operation of Fig. 1 control apparatus*

In considering the operation of the synchronizing-signal separating and automatic-gain-control apparatus 19, it will be assumed initially that the proper operating biases have been established across networks 32 and 45 by a few cycles of operation of the apparatus and that the tube 30 is normally nonconductive and is effective to conduct only during the occurrence of line-synchronizing pulses. As previously mentioned, the composite video-frequency signal including the usual picture components, the line-synchronizing and field-synchronizing components and the unidirectional components is supplied by the output circuit of the direct-current video-frequency amplifier 16 to the terminals 26, 26 coupled to the control electrode-cathode input circuit of the tube 30. There is also applied to the anode-cathode circuit of that tube by way of the coupling condenser 39 and the terminals 29, 29 a control signal comprising periodic positive polarity gating pulses supplied by the line-scanning amplifier 23. These periodic pulses, which constitute the sole anode energizing potential for the tube 30, are applied to the anode thereof in synchronous relation with, in particular coincident with, the application of the line-synchronizing pulses periodically and momentarily to render the tube 30 conductive, thereby to develop across the network 32, or a portion thereof such as across the resistor 35, a control effect or unidirectional potential of positive polarity dynamically related to the peak amplitude of the line-synchronizing components. Specifically, the developed potential is proportional to the amplitude of those components and is positive at the cathode of the tube 30. A potential, having a value related to the aforesaid cathode potential but having a negative polarity at the junction of the resistors 46 and 48, is developed across the network 45 since the networks 32 and 45 are both in the same direct-current anode-cathode loop or circuit of the tube 30. The potential developed across the last-mentioned network for application to the output terminals 28, 28 is related to the average direct current drawn from the anode excitation source comprising the terminals 29, 29, and this potential, as will be made clear subsequently, constitutes an automatic-gain-control potential related to the peak value of the composite video-frequency signal applied to the terminals 26, 26. Hence, the potential just mentioned is proportional to the effective amplitude of the carrier component of the television signal intercepted by the antenna system 10, 11 of the receiver and is most effective for its designated purpose.

Considering further the action of the circuit 19 on the signals applied to the terminals 26, 26 and 29, 29, the resistor 37 coupled between one of the terminals 26, 26 and the control electrode of the tube 30 is effective to produce some positive clipping of any noise pulses having an amplitude equal to or greater than the synchronizing pulses. The conjoint action on the tube 30 of the gating pulses and the line-synchronizing pulses is to establish a variable direct-current reference level or positive potential at the cathode of the tube 30, that is, across the network 32. This level is determined by the amplitude of the line-synchronizing pulses. Thus, should the amplitude of the video-frequency signal and, hence, the line-synchronizing pulses, decrease in amplitude for any reason such as atmospheric disturbances or fading which affects the received wave-signal intensity, the bias developed across the network decreases proportionally so that the average amplitude of the potential between the control electrode and the cathode of the tube 30 remains at a level which bears a substantially fixed relationship to the level corresponding to the level of the synchronizing-signal peaks applied to the control electrode of tube 30. Conversely, when the amplitude of the synchronizing-signal pulses increases, the potential appearing across the network 32 increases in proportion to the aforesaid amplitude increase. Consequently, the reference level or potential established at the cathode of the tube 30, or the potential across a portion of the network 32, varies in accordance with the peak amplitudes of the components of the signal applied to the terminals 26, 26. This in turn keeps the average amplitude of the potential between the control electrode and the cathode at a level which bears a substantially fixed relationship to the level corresponding to the level of the synchronizing-signal peaks applied to the control electrode of tube 30.

Potential changes corresponding to those appearing across the network 32 but of opposite polarity thereto are developed across the network 45. Since the time constant of the network 45 is long with reference to the interval between line-synchronizing pulses, an average potential related to the peak amplitude of the line-synchronizing signal components and, hence, the carrier amplitude, is developed across that network and constitutes an accurate desirable automatic-gain-control potential.

Considering the circuit of the tube 30 from a somewhat different standpoint, the circuit may be regarded for direct-current conditions as being in the nature of a cathode-follower amplifier wherein the potential of the cathode follows that of the control electrode. Thus, the average potential of the cathode of the tube 30 bears a fixed relationship to the instantaneous potential appearing on the control electrode of that tube during the occurrence of a synchronizing-signal pulse. Expressed somewhat differently, the composite video-frequency signal applied to the control electrode-cathode circuit of the tube 30 effectively acts in series with the variable direct-current reference level established at the cathode of the tube, or across a selected portion of the network 32. Thus, the circuit of the tube 30 may be considered to constitute a clamping circuit which is effective to clamp the cathode, or a selected point on the network 32, to a varying reference level. The significance of this feature will be made clear presently.

The resistor 43, which is connected between the junction of the resistors 34 and 35 and the cathode of the diode 42, is effective to apply a suitable positive bias to the cathode of the diode, thus determining the magnitude of the signal required for application to the anode of that tube to render it conductive. This bias is so selected as by suitable proportioning of the values of the resistors 34 and 35 that the clipping level is in the amplitude range devoted only to the synchronizing-signal components. Thus the diode 42 is so arranged that it is conductive only during the occurrence of the synchronizing-signal pulses and there is developed across its load resistor 43 and the resistor 35 only synchronizing-signal pulses having approximately constant amplitudes for application by the terminals 27, 27 to the inter-synchronizing-signal separator 20. The unit 19 is thus effective to derive from the applied composite video-frequency signal line-synchronizing components which have an approximately constant amplitude despite wide variations in the amplitude of the applied signal occasioned by fading and variations in the signal-translating characteristic of preceding units of the television receiver. The use of a diode load impedance 43 having a high impedance tends to minimize the current drawn thereby from the signal applied to the terminals 26, 26.

In addition to supplying a synchronizing-signal output signal having an approximately constant amplitude, unit 19 has a low susceptibility to undesired random pulses or noise, in particular to noise occurring during the intervals between applied line-synchronizing pulses. Since short-duration positive pulses are applied to the input terminals 29, 29 of the unit 19 from the line-scanning amplifier 23 to gate or key the tube 30 into conduction, the anode-cathode path through the tube is conductive only for a very small percentage of the time and the resistor 37 so limits the current that can flow from the control electrode to the cathode due to strong noise pulses that the average value of this control-electrode current is normally small in comparison with that of the anode-cathode current. Accordingly, random or noise impulses occurring between synchronizing pulses have an inappreciable effect on the operation of the tube 30 and also on the magnitude of the variable bias potentials developed across the networks 32 and 45. Consequently, the automatic-gain-control portion of the unit 19 constitutes a so-called "keyed automatic-gain-control system" which is characterized by its excellent noise immunity and relative freedom from airplane flutter type of fading. Noise impulses having an amplitude greater than the desired synchronizing pulses are initially reduced by grid-current limiting in the circuit including the resistor 37 and, due to the periodic conductivity of the tube 30 at the line-sychronizing signal rate, the reference level developed at the junction of the resistors 34 and 35 is not appreciably affected by high-amplitude noise appearing in the signal applied to the terminals 26, 26 of the unit 19. Thus, the synchronizing signal supplied by the output terminals 27, 27 to the unit 20 is relatively free from undesired random noise pulses and is also relatively unaffected by the level of the composite video-frequency input signal applied to the terminals 26, 26. Accordingly, the operation of units such as the generators 21 and 22 and the image-reproducing device 17, succeeding the unit 19, is greatly improved under adverse conditions such as when the wave signal intercepted by the receiver varies considerably in level and contains large amplitude random noise impulses. The units 21 and 22 will not be erroneously synchronized and the interlace of the device 17 will be particularly improved under adverse conditions of the type previously mentioned.

The control apparatus 19 has utility in low-gain, intermediate-gain and high-gain television receivers and, in general, requires for the various applications, networks 32 having different impedances. For example, in a high-gain receiver, that is, one which has sufficient sensitivity so that thermal noise is effective to produce a full video-frequency output signal, experience has indicated that it is possible to employ a cathode impedance network for the tube 30 which has a lower impedance than would be required in a low-gain or an intermediate-gain receiver without impairing the performance of the high-gain receiver at usable signal levels.

The following circuit constants are given as illustrative of circuit elements which may be utilized in the circuit of Fig. 1:

| | |
|---|---|
| Resistor **34** | 47 kilohms. |
| Resistor **35** | 470 kilohms. |
| Resistor **37** | 10 kilohms. |
| Resistor **43** | 470 kilohms. |
| Resistor **46** | 220 kilohms. |
| Resistor **48** | 100 kilohms (max.). |
| Condenser **33** | 0.22 microfarad. |
| Condenser **40** | 100 micromicrofarads. |
| Condenser **47** | 0.22 microfarad. |
| Tube **30** | Type 12AU7. |
| Tube **42** | Type 6AL5 (½ thereof). |
| Periodic potential applied to terminals **26**, **26** | About 45 volts peak-to-peak. |
| Peak periodic potential applied to anode of tube **30** | About 350 volts. |
| Duration of potential applied to anode of tube **30** | About 7½ microseconds. |
| Potential at output terminals **27**, **27** | About 2 volts. |

Figure 2:
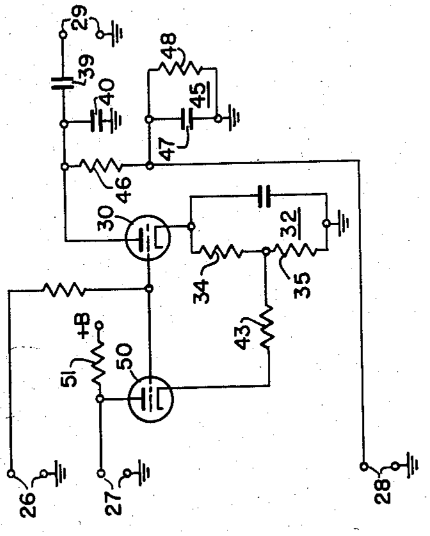
Fig. 2 is a schematic circuit diagram of a modified form of the control apparatus represented in Fig. 1.

*Description and operation of Fig. 2 apparatus*

Referring now to Fig. 2 of the drawings, there is represented a circuit diagram of a modified form of the control apparatus which is generally similar to that represented in Fig. 1. Accordingly, corresponding elements are designated by the same reference numerals. The control apparatus of Fig. 2 differs essentially from that of Fig. 1 in that a triode 50 is employed in place of the diode rectifier device 42 of Fig. 1. The control electrodes of the tubes 50 and 30 are interconnected and the cathode of the tube 50 is connected to one terminal of the resistor 43. The anode of the tube 50 is connected to a source of potential +B through a load resistor 51 and is also directly connected to the high-potential one of the synchronizing-signal output terminals 27, 27. The network 32 of the Fig. 2 apparatus is ordinarily proportioned to develop a somewhat smaller control potential than the corresponding network of the Fig. 1 circuit since the synchronizing-signal clipping level of the Fig. 2 apparatus is dependent on the control electrode-cathode cutoff potential for the tube 50.

The operation of the apparatus of Fig. 2 is essentially the same as that of the Fig. 1 control apparatus and, therefore, a detailed explanation will not be repeated. The triode 50 is normally nonconductive and the periodic pulses of approximately constant amplitude derived between the control electrode of the tube 30 and the junction of the resistors 34 and 35 are effective periodically to render the triode 50 conductive. Accordingly, there is developed between the terminals 27, 27 a relatively noise-free synchronizing signal having an approximately constant amplitude. In addition to providing amplification of the applied signal, the tube 50 produces in its output circuit synchronizing-signal energy derived from the source +B rather than from the input circuit including the terminals 26, 26 of the tube 30.

Figure 3:
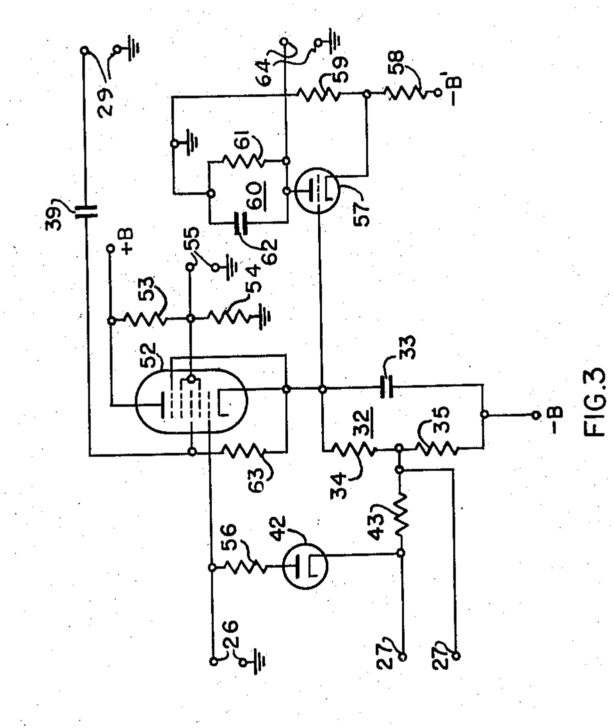
Fig. 3 represents schematically another form of a control apparatus in accordance with the present invention.

*Description of Fig. 3 control apparatus*

An additional modification of the control apparatus of the present invention is represented schematically in Fig. 3 of the drawings. This apparatus is generally similar to that represented in Fig. 1 and corresponding circuit elements in the two figures are designated by the same reference numerals. In lieu of the triode 30 of the Fig. 1 circuit, the Fig. 3 apparatus employs a pentagrid tube 52. The composite synchronizing signal from the terminals 26, 26 is applied to the input circuit including the inner control electrode. The anode of the diode 42 is connected to the ungrounded one of the terminals 26, 26 through a resistor 56. A control signal which has an amplitude substantially unaffected by the amplitude variations of the synchronizing-signal components is applied by the terminals 29, 29 and the coupling condenser 39 to the outer control electrode. This outer control electrode is connected to the cathode through a resistor 63. A source of potential +B is connected directly to the anode of the tube and is connected to the screen electrodes through a voltage divider comprising resistors 53 and 54. Synchronizing signals of negative polarity are derived from output terminals 55, 55 connected to the junction of the resistors 53 and 54 and ground. Synchronizing signals of positive polarity are derived between output terminals 27, 27 from load resistor 43 of diode 42. The low-potential terminal of the network 32 is connected to a source of potential indicated —B.

The control apparatus of Fig. 3 further includes a repeater system coupled to the network 32 for deriving from the control potential developed thereacross a second control potential having a value proportional to but of opposite polarity to that appearing across the network 32. This system includes a triode 57, the input electrodes of which are connected across the network 32 while space current therefor is provided from a source —B through a voltage divider comprising resistors 58 and 59. The tube 57 is provided with a time-constant load network 60 comprising a parallel-connected resistor 61 and condenser 62. A pair of output terminals 64, 64 are connected to the terminals of the network 60. The network 60, across which an automatic-gain-control potential is developed, has a time constant which is long with reference to the interval between line-synchronizing pulses.

The operation of the control apparatus of Fig. 3 is generally similar to that of the Fig. 1 apparatus and will not be repeated. Synchronizing-signal information is derived between the terminals 27, 27 and the positive control potential developed across the cathode impedance network 32 is reversed in polarity by the tube 57, thereby to develop across the network 60 and, hence, at the terminals 64, 64, an automatic-gain-control potential related to the peak amplitude of the video-frequency signal supplied to the input terminals 26, 26 of the unit. Since this potential is of negative polarity, it is suitable for application in the usual manner to the preceding stages of a television receiver. A high-amplitude synchronizing signal of negative polarity is also derived at the terminals 55, 55 coupled to the screen electrodes of the pentagrid tube 52. The information derived at the various other output terminals of the control apparatus of Fig. 3 corresponding with that appearing at corresponding terminals of the apparatus of Figs. 1 and 2.

While applicant does not intend to limit the invention to any specific circuit constants, the following circuit constants are given as illustrative of one embodiment of the invention constructed in accordance with the arrangement of Fig. 3:

| | |
|---|---|
| Resistor **34** | 33 kilohms. |
| Resistor **35** | 390 kilohms. |
| Resistors **43** and **53** | 470 kilohms. |
| Resistor **54** | 100 kilohms. |
| Resistor **56** | 15 kilohms. |
| Resistor **58** | 4.7 kilohms. |
| Resistor **61** | 22 kilohms. |
| Resistor **63** | 1.5 megohms. |
| Condenser **33** | 0.22 microfarad. |
| Condenser **62** | 5.0 microfarads. |
| +B | 215 volts. |
| —B | 100 volts (negative). |
| —B′ | 50 volts (negative). |
| Tube **42** | Type 6AL5 (½ thereof). |
| Tube **52** | Type 6BE6. |
| Tube **57** | Type 12AU7 (½ thereof). |

From the foregoing description of the various embodiments of applicant's invention, it will be apparent that it comprises a synchronizing-signal separating apparatus, particularly one of the type represented in Figs. 1 and 2, which is simple in construction, inexpensive to manufacture and yet capable of providing excellent rejection of interference such as random or impulse noise. It will also be clear that applicant's new and improved control apparatus is substantially unaffected by undesired noise appearing between indivdual line-synchronizing pulses of any composite video-frequency signal applied thereto. It will also be apparent that a control apparatus embodying the present invention is not only capable of deriving improved synchronizing-signal information from an applied composite video-frequency ssignal but also an automatic-gain-control effect which is relatively unaffected by undesired noise appearing in the applied signal.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. In a television receiver, a synchronizing-signal separating apparatus comprising: an electron-discharge means having input electrodes including a control electrode and a cathode and output electrodes effectively including an anode and said cathode; a circuit coupled to said input electrodes for applying thereto a composite modulation signal, the amplitude of which may vary and which includes the original unidirectional components, and undesired random noise pulses and synchronizing-signal pulses having such polarity as to tend to render said means conductive; an integrating network, connected as a cathode load for said means and including a point thereon remote from said cathode maintained at a fixed reference potential, having a time constant at least several times the period of said synchronizing pulses and dynamically responsive to electron discharges between said output electrodes for deriving a control effect normally maintaining said means in a nonconductive condition; a circuit including a direct-current path connected between said anode and said fixed reference point; a source of a control signal having an amplitude substantially unaffected by amplitude variations of said synchronizing pulses coupled to said output electrodes for supplying said control signal thereto in synchronous relation with said synchronizing pulses and with such polarity as to develop said discharges and render said means conductive substantially only during the coincidence of said synchronizing pulses and said control signal, thereby to develop across said network said control effect having a value dynamically related to the peak amplitude of said synchronizing pulses but substantially independent of said undesired noise pulses; and synchronizing-signal stripper means including an electron-discharge device coupled to said applying circuit and to said network at a point other than said fixed reference point and responsive to said modulation signal and said control effect for deriving from said modulation signal synchronizing pulses which have variations in magnitude that are small compared with said amplitude variations of said composite signal.

2. In a television receiver, a synchronizing-signal separating apparatus comprising: an electron-discharge means having input electrodes including a control electrode and a cathode and output electrodes effectively including an anode and said cathode; a circuit coupled to said input electrodes for applying thereto a composite modulation signal, the amplitude of which may vary and which includes the original unidirectional components, and undesired random noise pulses and synchronizing-signal pulses having such polarity as to tend to render said means conductive; an integrating network, connected as a cathode load for said means and including a point thereon remote from said cathode maintained at a fixed reference potential, having a time constant at least several times the period of said synchronizing pulses and dynamically responsive to electron discharges between said output electrodes for deriving a control effect normally maintaining said means in a nonconductive condition; a circuit including a direct-current path connected between said anode and said fixed reference point; a source of a control signal having an amplitude substantially unaffected by amplitude variations of said synchronizing pulses coupled to said output electrodes for supplying said control signal thereto in synchronous relation with said synchronizing pulses and with such polarity as to develop said discharges and render said means conductive substantially only during the coincidence of said synchronizing pulses and said control signal, thereby to develop across said network said control effect having a value dynamically related to the peak amplitude of said synchronizing pulses but substantially independent of said undesired noise pulses; and synchronizing-signal stripper means including a unidirectionally conductive device coupled to said applying circuit and to said network at a point other than said fixed reference point and responsive to said modulation signal and said control effect for deriving from said modulation signal synchronizing pulses which have variations in magnitude that are small compared with said amplitude variations of said composite signal.

3. In a television receiver, a synchronizing-signal separating apparatus comprising: an electron-discharge means having input electrodes including a control electrode and a cathode and output electrodes effectively including an anode and said cathode; a circuit coupled to said input electrodes for applying thereto a composite modulation signal, the amplitude of which may vary and which includes the original unidirectional components, and undesired random noise pulses and synchronizing-signal pulses having such polarity as to tend to render said means conductive; an integrating network, connected as a cathode load for said means and including a point thereon remote from said cathode maintained at a fixed reference potential, having a time constant at least several times the period of said synchronizing pulses and dynamically responsive to electron discharges between said output electrodes for deriving a control effect normally maintaining said means in a nonconductive condition; a circuit including a direct-current path connected between said anode and said fixed reference point; a source of a control signal having an amplitude substantially unaffected by amplitude variations of said synchronizing pulses coupled to said output electrodes for supplying said control signal thereto in synchronous relation with said synchronizing pulses and with such polarity as to develop said discharges and render said means conductive substantially only during the coincidence of said synchronizing pulses and said control signal, thereby to develop across said network said control effect having a value dynamically related to the peak amplitude of said synchronizing pulses but substantially independent of said undesired noise pulses; and synchronizing-signal stripper means including a rectifier device and a load resistor therefor having a large value of resistance coupled between said applying circuit and said network at a point other than said fixed reference point and responsive to said modulation signal and said control effect for deriving across said resistor from said applied modulation signal synchronizing pulses which have variations in magnitude that are small compared with said amplitude variations of said composite signal.

4. In a television receiver, a synchronizing-signal separating apparatus comprising: an electron-discharge means having input electrodes including a control electrode and a cathode and output electrodes effectively including an anode and said cathode; a circuit coupled to said input electrodes for applying thereto a composite modulation signal, the amplitude of which may vary and which includes the original unidirectional components, and undesired random noise pulses and synchronizing-signal pulses having such polarity as to tend to render said means conductive; a resistor connected in said circuit and responsive to an electron discharge which may be produced between said input electrodes by said noise pulses for limiting the magnitude of the electron discharge therebetween; an integrating network, connected as a cathode load for said means and including a point thereon remote from said cathode maintained at a fixed reference potential, having a time constant at least several times the period of said synchronizing pulses and dynamically responsive to electron discharges between said output electrodes for deriving a control effect normally maintaining said means in a nonconductive condition; a circuit including a direct-current path connected between said anode and said fixed reference point; a source of a control signal having an amplitude substantially unaffected by amplitude variations of said synchronizing pulses coupled to said output electrodes for supplying said control signal thereto in synchronous relation with said synchronizing pulses and with such polarity as to develop the discharges between said output electrodes and render said means conductive substantially only during the coincidence of said synchronizing pulses and said control signal, thereby to develop across said network said control effect having a value dynamically related to the peak amplitude of said synchronizing pulses but substantially independent of said undesired noise pulses; and synchronizing-signal stripper means including an electron-discharge device coupled to said applying circuit and to said network at a point other than said fixed reference point and responsive to said modulation signal and said control effect for deriving from said applied modulation signal synchronizing pulses which have variations in magnitude that are small compared with said amplitude variations of said composite signal.

5. In a television receiver, a synchronizing-signal separating apparatus comprising: a triode having input electrodes including a control electrode and a cathode and output electrodes effectively including an anode and said cathode; a circuit coupled to said input electrodes for applying thereto a composite modulation signal, the amplitude of which may vary and which includes the original unidirectional components, and undesired random noise pulses and synchronizing-signal pulses having such polarity as to tend to render said triode conductive; an integrating network, connected as a cathode load for said triode and including a point thereon remote from said cathode maintained at a fixed reference potential, having a time constant at least several times the period of said synchronizing pulses and dynamically responsive to electron discharges between said output electrodes for deriving a control effect normally maintaining said triode in a nonconductive condition; a circuit including a direct-current path connected between said anode and said fixed reference point; a source of a control signal having an amplitude substantially unaffected by amplitude variations of said synchronizing pulses coupled to said output electrodes for supplying said control signal thereto in synchronous relation with said synchronizing pulses and with such polarity as to develop said discharges and render said triode conductive substantially only during the coincidence of said synchronizing pulses and said control signal, thereby to develop across said network said control effect having a value dynamically related to the peak amplitude of said synchronizing pulses but substantially independent of said undesired noise pulses; and synchronizing-signal stripper means including an electron-discharge device coupled to said control electrode and to said network at a point other than said fixed reference point and responsive to said modulation signal and said control signal for deriving from said applied modulation signal synchronizing pulses which have variations in magnitude that are small compared with said amplitude variations of said composite signal.

6. In a television receiver, a synchronizing-signal separating apparatus comprising: an electron-discharge means having input electrodes including a control electrode and a cathode and output electrodes effectively including an anode and said cathode; a circuit coupled to said input electrodes for applying thereto a composite modulation signal, the amplitude of which may vary and which includes the original unidirectional components, and undesired random noise pulses and synchronizing-signal pulses having such polarity as to tend to render said means conductive; an integrating network, connected as a cathode load for said means and including a point thereon remote from said cathode maintained at a fixed reference potential, having a time constant at least several times the period of said synchronizing pulses and dynamically responsive to electron discharges between said output electrodes for deriving a control effect normally maintaining said means in a nonconductive condition; a circuit including a direct-current path connected between said anode and said fixed reference point; a source of a control signal having an amplitude substantially unaffected by amplitude variations of said synchronizing pulses coupled to said output electrodes for supplying said control signal thereto in synchronous relation with said synchronizing pulses and with such polarity as to develop said discharges and render said means conductive substantially only during the coincidence of said synchronizing pulses and said control signal, thereby to develop across said network said control effect having a value dynamically related to the peak amplitude of said synchronizing pulses but substantially independent of said undesired noise pulses; and synchronizing-signal stripper means including a repeater having an output circuit and having an input circuit coupled between said applying circuit and a point on said network intermediate said cathode and said fixed reference point and responsive to said modulation signal and said control effect for deriving in said output circuit from said modulation signal synchronizing pulses which have variations in magnitude that are small compared with said amplitude variations of said composite signal.

7. In a television receiver, a synchronizing-signal separating apparatus comprising: an electron-discharge means having input electrodes including a control electrode and a cathode and output electrodes effectively including an anode and said cathode; a circuit coupled to said input electrodes for applying thereto a composite modulation signal, the amplitude of which may vary and which includes the original unidirectional components, and undesired random noise pulses and synchronizing-signal pulses having such polarity as to tend to render said means conductive; an integrating network, connected as a cathode load for said means and including a point thereon remote from said cathode maintained at a fixed reference potential, having a time constant at least several times the period of said synchronizing pulses and dynamically responsive to electron discharges between said output electrodes for deriving a control effect normally maintaining said means in a nonconductive condition; a circuit including a direct-current path connected between said anode and said fixed reference point; a source of a control signal having an amplitude substantially unaffected by amplitude variations of said synchronizing pulses coupled to said output electrodes for supplying said control signal thereto in synchronous relation with said synchronizing pulses and with such polarity as to develop said discharges and render said means conductive substantially only during the coincidence of said synchronizing pulses and said control signal, thereby to develop across said network said control effect having a value dynamically related to the peak amplitude of said synchronizing pulses but substantially independent of said undesired noise pulses; and synchronizing-signal stripper means including a diode having an anode coupled to said applying circuit and a cathode coupled to said network at a point other than said fixed reference point for deriving synchronizing pulses which have variations in magnitude that are small compared with said amplitude variations of said composite signal.

8. In a television receiver, a synchronizing-signal separating apparatus comprising: an electron-discharge means having input electrodes including a control electrode and a cathode and output electrodes effectively including an anode and said cathode; a circuit coupled to said input electrodes for applying thereto a composite modulation signal, the amplitude of which may vary and which includes the original unidirectional components, and undesired random noise pulses and synchronizing-signal pulses having such polarity as to tend to render said means conductive; an integrating network, connected as a cathode load for said means and including a pair of series-connected resistors and a condenser connected in parallel with said resistors and including a point thereon remote from said cathode maintained at a fixed reference potential, having a time constant at least several times the period of said synchronizing pulses and dynamically responsive to electron discharges between said output electrodes for deriving a control effect normally maintaining said means in a nonconductive condition; a circuit including a direct-current path connected between said anode and said fixed reference point; a source of a control signal having an amplitude substantially unaffected by amplitude variations of said synchronizing pulses coupled to said output electrodes for supplying said control signal thereto in synchronous relation with said synchronizing pulses and with such polarity as to develop said discharges and render said means conductive substantially only during the coincidence of said synchronizing pulses and said control signal, thereby to develop across said network said control effect having a value dynamically related to the peak amplitude of said synchronizing pulses but substantially independent of said undesired noise pulses; and synchronizing-signal stripper means including a rectifier device and a load resistor coupled between said applying circuit and the junction of said series-connected resistors and responsive to said modulation signal and said control effect for deriving across said load resistor and one of said series-connected resistors synchronizing pulses which have variations in magnitude that are small compared with said amplitude variations of said composite signal.

9. In a television receiver, a synchronizing-signal separating apparatus comprising: a pentagrid electron tube including an anode, inner and outer control electrodes, a cathode, and screen electrodes; a circuit coupled to said inner control electrode and cathode for applying thereto a composite modulation signal, the amplitude of which may vary and which includes the original unidirectional components, and undesired random noise pulses and synchronizing-signal pulses having such polarity as to tend to render said tube conductive; an integrating network, connected as a cathode load for said tube and including a point thereon remote from said cathode maintained at a fixed reference potential, having a time constant at least several times the period of said synchronizing pulses and dynamically responsive to electron discharges between said screen electrode and said cathode for deriving a control effect normally maintaining said tube in a nonconductive condition; a circuit including a direct-current path connected between said anode and said fixed reference point; potential-supply means coupled to said anode and said screen electrode; a source of a control signal having an amplitude substantially unaffected by amplitude variations of said synchronizing pulses coupled to said outer control electrode and said cathode for supplying said control signal thereto in synchronous relation with said synchronizing pulses and with such polarity as to develop said discharges and render said tube conductive substantially only during the coincidence of said synchronizing pulses and said control signal, thereby to develop across said network said control effect having a value dynamically related to the peak amplitude of said synchronizing pulses but substantially independent of said undesired noise pulses; and synchronizing-signal stripper means including an electron-discharge device coupled to said applying circuit and to said network at a point other than said fixed reference point and responsive to said modulation signal and said control effect for deriving from said modulation signal synchronizing pulses which have variations in magnitude that are small compared with said amplitude variations of said composite signal.

10. An apparatus for automatically controlling an operating characteristic of a television receiver comprising: an electron-discharge means having input electrodes including a control electrode and a cathode and output electrodes effectively including an anode and said cathode; a circuit coupled to said input electrodes for applying thereto a composite modulation signal, the amplitude of which may vary and which includes the original unidirectional components, and undesired random noise pulses and synchronizing-signal pulses having such polarity as to tend to render said means conductive; a first integrating network, connected as a cathode load for said means and including a point thereon remote from said cathode maintained at a fixed reference potential, having a time constant at least several times the period of said synchronizing pulses and dynamically responsive to electron discharges between said output electrodes for deriving a first control effect normally maintaining said means in a nonconductive condition; a circuit including a direct-current path comprising a second integrating network having a time constant at least several times said period of said synchronizing pulses connected between said anode and said fixed reference point; a source of a control signal having an amplitude substantially unaffected by amplitude variations of said synchronizing pulses coupled to said output electrodes for supplying said control signal thereto in synchronous relation with said synchronizing pulses and with such polarity as to develop said discharges and render said means conductive substantially only during the coincidence of said synchronizing pulses and said control signal, thereby to develop across said networks control effects including said first control effect and having values dynamically related to the peak amplitude of said synchronizing pulses but substantially independent of said undesired noise pulses; a circuit coupled to said second integrating network for applying said second control effect developed thereacross to said receiver; and synchronizing-signal stripper means including an electron-discharge device coupled between said applying circuit and said first network at a point other than said fixed reference point and responsive to said modulation signal and said first control effect for deriving from said modulation signal synchronizing pulses which have variations in magnitude that are small compared with said amplitude variations of said composite signal.

11. In a television receiver adapted to receive television signals having a recurrent synchronizing pulse component and comprising a video amplifier having an output terminal, a keyed noise clipper comprising: a unilateral conduction device having an anode, a cathode, and a control electrode, a point of reference potential, a capacitor connected between the cathode of said unilateral conduction device and said point of reference potential, a direct-current path including a resistance connected between the cathode of said unilateral conduction device and said point of reference potential, means connecting the output terminal of said video amplifier to the control electrode of said unilateral conduction device so as to apply to said control electrode television signals whose recurrent synchronizing pulse component extends in a positive direction, rectifier means including an anode and a cathode connected between the output terminal of said video amplifier and the cathode of said unilateral conduction device with the cathode of the rectifier means connected to the cathode of said unilateral conduction device, and means to apply to the anode of said unilateral conduction device keying pulses synchronous with the recurrent pulse component of the television signals, said keying pulses having a positive polarity with respect to said point of reference potential.

12. In a television receiver adapted to receive television signals having a recurrent synchronizing pulse component and comprising a video amplifier having an output terminal, a keyed noise clipper comprising: a unilateral conduction device having an anode, a cathode, and a control electrode, a point of reference potential, a capacitor connected between the cathode of said unilateral conduction device and said point of reference potential, a resistor connected in shunt with said capacitor, means including a resistor for connecting the output terminal of said video amplifier to the control electrode of said unilateral conduction device so as to apply to said control electrode television signals whose recurrent synchronizing pulse component extends in a positive direction, rectifier means including an anode and a cathode connected between the output terminal of said video amplifier and the cathode of said unilateral conduction device with the cathode of said rectifier means connected to the cathode of said unilateral conduction device, and means to apply to the anode of said unilateral conduction device keying pulses synchronous with the recurrent pulse component of the television signals, said keying pulses having a positive polarity with respect to said point of reference potential.

13. In a television receiver adapted to receive television signals having a recurrent synchronizing pulse component and comprising a video amplifier having an output terminal, a keyed noise clipper comprising: a normally nonconductive unilateral conduction device having an anode, a cathode, and a control electrode, a point of reference potential, a capacitor connected between the cathode of said unilateral conduction device and said point of reference potential, a direct-current path including a resistance connected between the cathode of said unilateral conduction device and said point of reference potential, means connecting the output terminal of said video amplifier to the control electrode of said unilateral conduction device so as to apply to said control electrode television signals whose recurrent synchronizing pulse component extends in a positive direction, a rectifier having an anode and a cathode, a resistor connected between the output terminal of said video amplifier and the anode of said rectifier, a connection between the cathode of said rectifier and the cathode of said unilateral conduction device, and means to apply to the anode of said unilateral conduction device keying pulses synchronous with the recurrent pulse component of the television signals to render conductive said normally nonconductive unilateral conduction device during the occurrence of said keying pulses, said keying pulses having a positive polarity with respect to said point of reference potential.

14. A synchronizing-signal separating apparatus for a television receiver including a first supply circuit for a composite video-frequency signal including the direct-current component and picture components interspersed with synchronizing pulses and subject to undesired random noise pulses and including a second supply circuit for gating pulses synchronous with said synchronizing pulses and substantially unaffected in amplitude by variations in the intensity of said signal, comprising: means including a single electron-discharge device actuated jointly by said gating and said synchronizing pulses for developing from the latter a unidirectional potential substantially proportional to the amplitude of said synchronizing pulses and relatively unaffected by said noise pulses; and a nonlinear circuit element connected to the first supply circuit and said means and means whereby said nonlinear circuit element has a threshold response and, above the threshold, responsive differentially to said signal and said unidirectional potential for developing output synchronizing pulses having variations in magnitude that are small compared with said intensity variations of said composite signal.

15. A synchronizing-signal separating apparatus for a television receiver comprising: a first supply circuit for a composite video-frequency signal including the direct-current component and picture components interspersed with synchronizing pulses and subject to undesired random noise pulses; a second supply circuit for gating pulses synchronous with said synchronizing pulses and substantially unaffected in amplitude by variations in the intensity of said signal; means including a single electron-discharge device actuated jointly by said gating and said synchronizing pulses and including a passive energy-storage network coupled to said device and having bidirectional conductivity for developing across at least a portion of said network from said synchronizing pulses a unidirectional potential substantially proportional to the amplitude of said synchronizing pulses and relatively unaffected by said noise pulses; and a nonlinear circuit element connected to said first supply circuit and said means and means whereby said nonlinear circuit element has a threshold response and, above the threshold, responsive differentially to said signal and said unidirectional potential for developing output synchronizing pulses having variations in magnitude that are small compared with said intensity variations of said composite signal.

16. A synchronizing-signal separating apparatus for a television receiver comprising: a first supply circuit for a composite video-frequency signal including the direct-current component and picture components interspersed with synchronizing pulses and subject to undesired random noise pulses; a second supply circuit for gating pulses synchronous with said synchronizing pulses and substantially unaffected in amplitude by variations in the intensity of said signal; means include a single electron-discharge device actuated jointly by said gating and said synchronizing pulses and including a pair of series-connected resistors and a condenser connected in parallel with said resistors and forming therewith an integrating network coupled to said device and having a time constant at least several times the period of said synchronizing pulses for developing from the latter across said network a unidirectional potential substantially proportional to the amplitude of said synchronizing pulses and relatively unaffected by said noise pulses; and a nonlinear circuit element connected to said first supply circuit and the junction of said resistors and means whereby said nonlinear circuit element has a threshold response established by the potential at said junction and, above the threshold, responsive differentially to said signal and said unidirectional potential for developing output synchronizing pulses having variations in magnitude that are small compared with said intensity variations of said composite signal.

17. A synchronizing-signal separating apparatus for a television receiver comprising: a first supply circuit for a composite video-frequency signal including the direct-current component and picture components interspersed with synchronizing pulses and subject to undesired random noise pulses; a second supply circuit for gating pulses synchronous with said synchronizing pulses and substantially unaffected in amplitude by variations in the strength of said signal; means including a single electron-discharge device actuated jointly by said gating and said synchronizing pulses for developing from the latter a unidirectional potential substantially proportional to the amplitude of said synchronizing pulses and relatively unaffected by said noise pulses; and a repeater having an output circuit and having an input circuit connected to said first supply circuit and said means and means whereby said repeater has a threshold response and, above the threshold, responsive differentially to said signal and said unidirectional potential for developing in said output circuit output synchronizing pulses having variations in magnitude that are small compared with said intensity variations of said composite signal.

18. A synchronizing-signal separating apparatus for a television receiver including a first supply circuit for a composite video-frequency signal including the direct-current component and picture components interspersed with synchronizing pulses and subject to undesired random noise pulses and including a second supply circuit for gating pulses coincident with said synchronizing pulses and substantially unaffected in amplitude by variations in the intensity of said signal comprising: means including an electron-discharge device having a single electron stream which is rendered conductive by the joint action of said gating and said synchronizing pulses for developing from the latter a unidirectional potential substantially proportional to the amplitude of said synchronizing pulses and relatively unaffected by said noise pulses; and a nonlinear circuit element connected to the first supply circuit and said means and means whereby said nonlinear circuit element has a threshold response and, above the threshold, responsive differentially to said signal and said unidirectional potential for developing output synchronizing pulses having variations in magnitude that are small compared with said intensity variations of said composite signal.

19. A synchronizing-signal separating apparatus for a television receiver including a first supply circuit for a composite video-frequency signal including the direct-current component and picture components interspersed with synchronizing pulses and subject to undesired random noise pulses and including a second supply circuit for gating pulses coincident with said synchronizing pulses and substantially unaffected in amplitude by variations in the intensity of said signal comprising: means including an electron-discharge device having a cathode and a single electron stream leaving said cathode with input electrodes therein responsive to the coincident application thereto of said gating and said synchronizing pulses for rendering said device conductive to develop from said synchronizing pulses a unidirectional potential substantially proportional to the amplitude of said synchronizing pulses and relatively unaffected by said noise pulses; and a nonlinear circuit element connected to the first supply circuit and said means and means whereby said nonlinear circuit element has a threshold response and, above the threshold, responsive differentially to said signal and said unidirectional potential for developing output synchronizing pulses having variations in magnitude that are small compared with said intensity variations of said composite signal.

References Cited in the file of this patent

UNITED STATES PATENTS 2,589,927 Crane et al. ............ Mar. 18, 1952